United States Patent [19]

Butler et al.

[11] Patent Number: 4,837,811
[45] Date of Patent: Jun. 6, 1989

[54] TELEPHONE TECHNICIAN'S TERMINALS

[75] Inventors: Myron C. Butler, Edmond, Okla.; Christopher Madore, Cypress, Calif.

[73] Assignee: Communication Manufacturing Co., Los Angeles, Calif.

[21] Appl. No.: 148,427

[22] Filed: Jan. 25, 1988

[51] Int. Cl.[4] .................... H04M 1/21; H04M 11/00
[52] U.S. Cl. ...................................... 379/96; 379/21; 379/97
[58] Field of Search ..................... 379/96, 93, 21, 97

[56] References Cited

U.S. PATENT DOCUMENTS 4,268,721  5/1981  Nielson et al. ..................... 379/96

Primary Examiner—Stafford D. Schreyer
Attorney, Agent, or Firm—Laney, Dougherty, Hessin & Beavers

[57] ABSTRACT

An improved craft technician's field terminal of the portable, hand-held type for use in communicating in diverse modes with a central technician access network. The terminal is connected to the telephone line in conventional manner in communication with the telephone access network. Job data can then be transmitted from the central network and downloaded to the terminal for instantaneous display. Re-transmission can be requested if needed. The terminal is capable of uploading data from the terminal display in either DTMF and/or ASCII to the central network. The craft technician's terminal contains a much greater storage capacity than any similar devices heretofore and it is capable of holding job order and response data for what amounts to greater than a full days technician work. In addition, data displayed at the terminal may readily be transmitted for printer access while still being retained in the terminal storage.

11 Claims, 5 Drawing Sheets

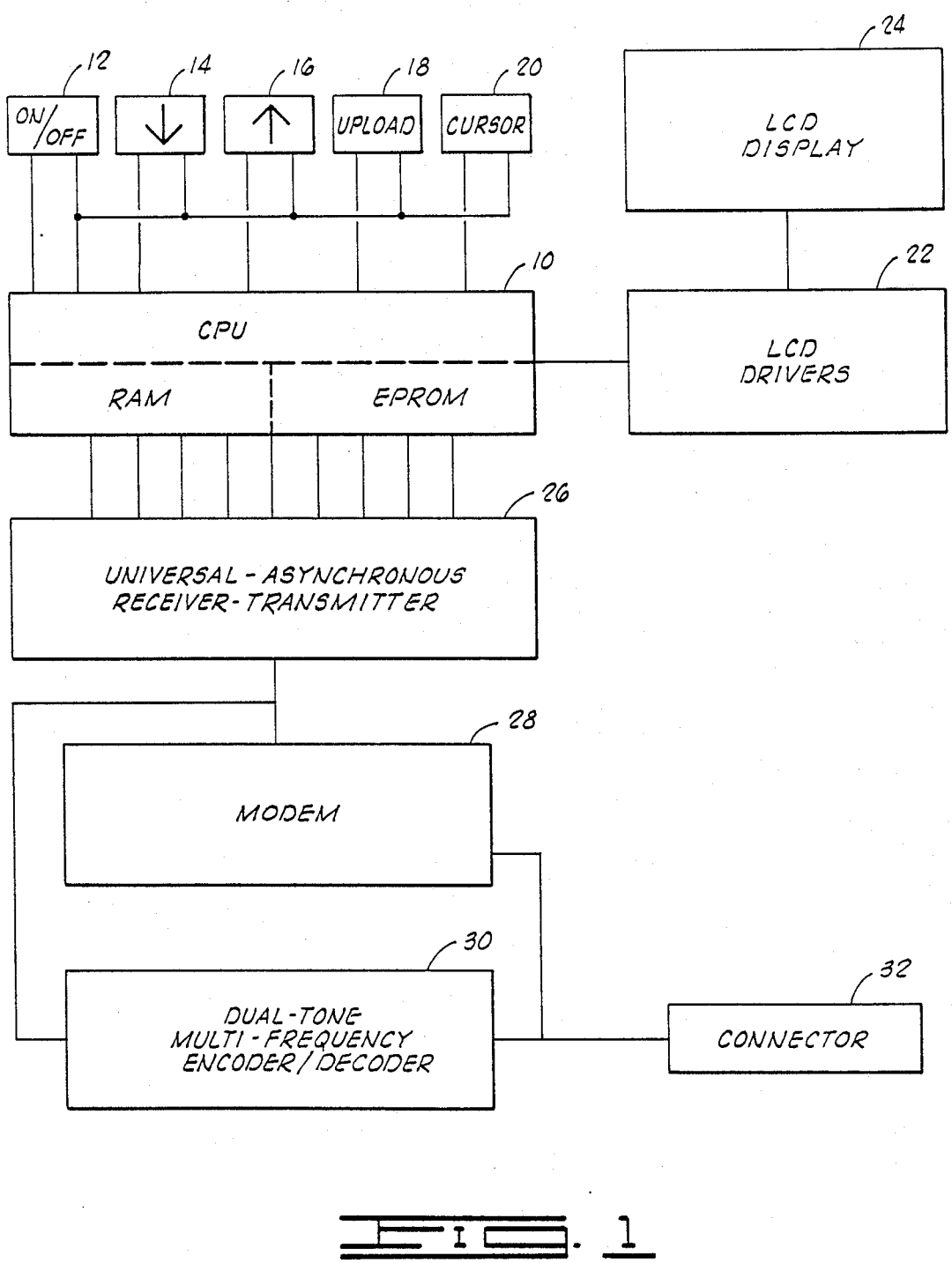

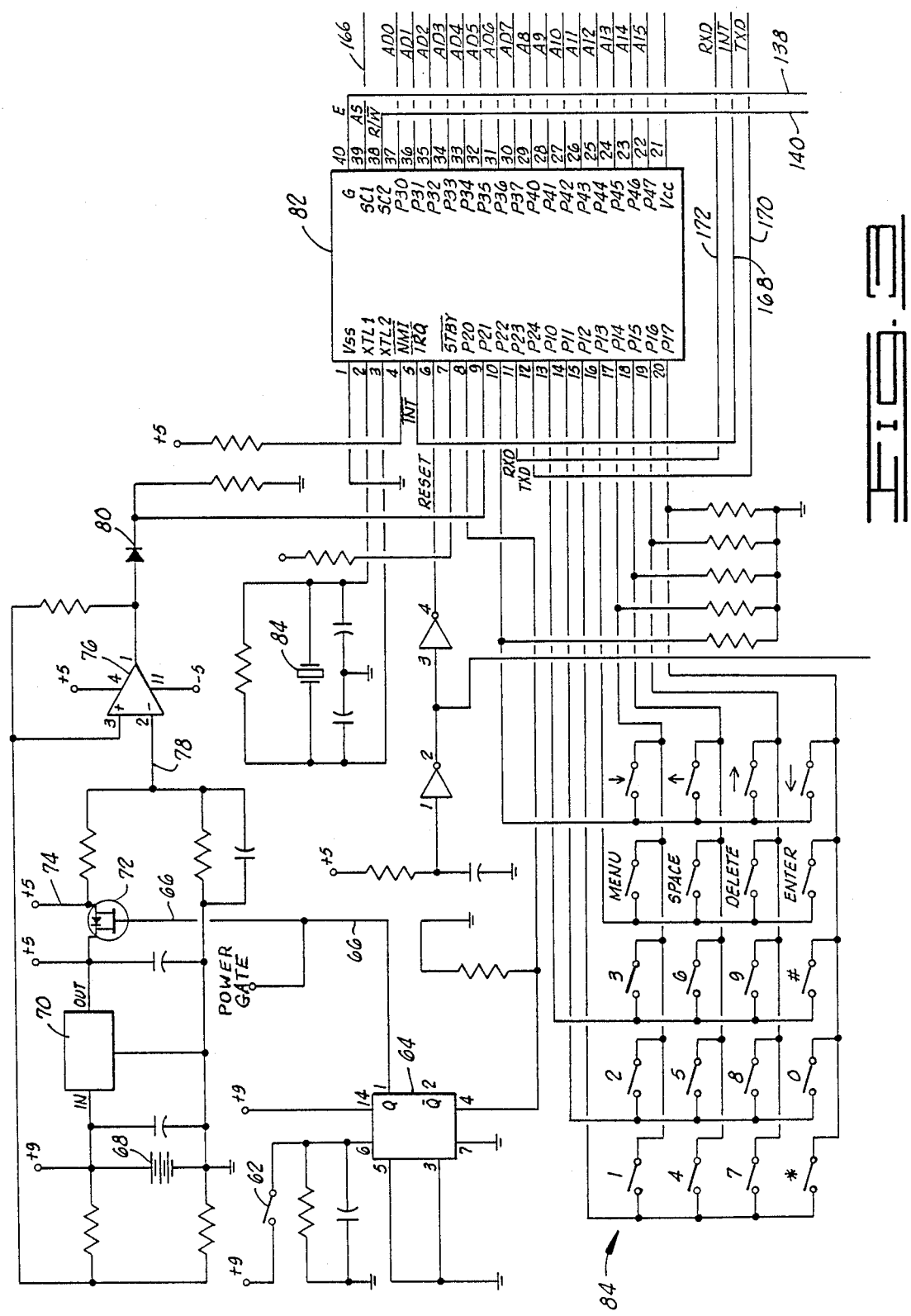

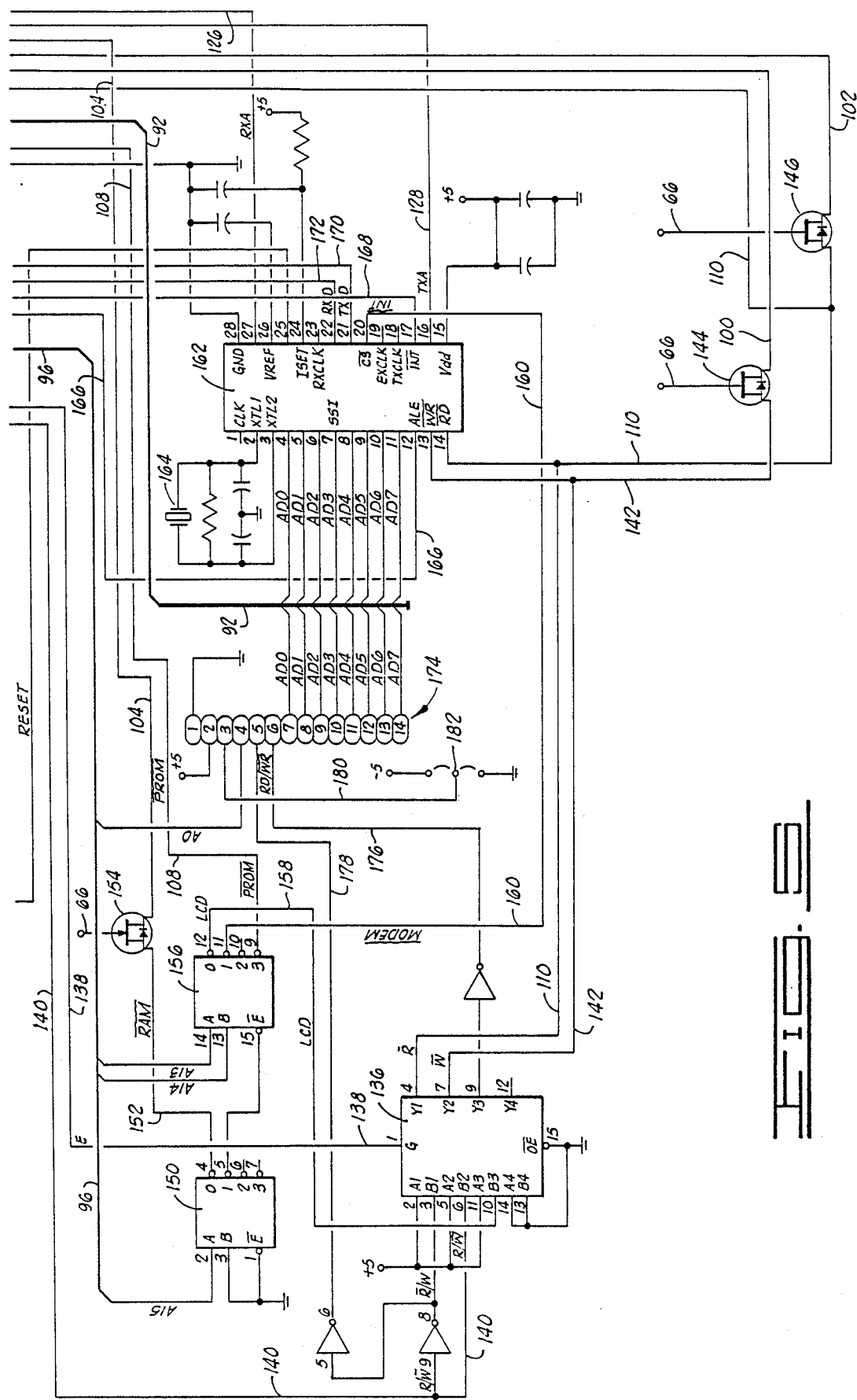

TELEPHONE TECHNICIAN'S TERMINALS

BACKGROUND OF THE INVENTION

1. Field of the Invention

The present invention relates to telephone equipment for technician's employ to communicate with a central maintenance office and, more particularly, but not by way of limitation, it relates to an improved form of craft terminal transmitter and receiver having increased capability as to data handling and storage capabilities.

2. Prior Art

Heretofore telephone technicians have relied upon portable handsets that may be interruptively connected into a telephone line for communication with a central office. This type of communication device has evolved into what today is referred to as a butt set, a standard and much used technician's tool. Newer telephone systems now function with a central maintenance network with which field technicians at various locations can communicate and exchange certain information relative to repair and maintenance of individual telephone stations. Technician terminals have evolved for communication in operating systems that are capable of additional communication functions of more sophisticated nature. U.S. Pat. No. 4,691,336 represents one such improved communication equipment. This unit consists of a connector coupling for connecting the set to the telephone line to communicate with a central maintenance office, and it also includes a selectively energizable amplifier for amplifying signals occurring on the telephone line and a speaker for audibly communicating the message to the technician. This enables the technician to have hands free for repair procedures while still being able to hear instructional or directional information.

Still other improved technician communication systems expand the functional capabilities of such devices. One such device teaches an internal modem coupled with a predetermined amount of random access memory and a battery powered amplifier and loud speaker. This unit also has the capability of operating with a companion printer that may be truck mounted in the technician's vehicle. Still other devices operating at higher levels of information exchange may include some form of display screen mounted in the hand-held terminal and a limited ASCII keyboard for sending alpha-numeric data. These types of devices require a truck-mounted companion printer to produce hardcopy.

SUMMARY OF THE INVENTION

The present invention is a telephone craft technician terminal that is capable of handling voice and/or data communication with a central technician access network (TAN), and the terminal is also capable of displaying data to the craft technician. The terminal can be connected to the telephone line in conventional manner and through signaling of the required access codes it is placed in communication with the telephone access network. A request for work data can then be made from the telephone access network and data is downloaded instantly for representation on the terminal display. Re-transmission can be easily requested if needed. The terminal is then capable of uploading data from the terminal display in either dual tone multi-frequency (DTMF) and/or ASCII to the technician access network. The terminal contains a much greater storage capacity than any known devices for similar application, and since a typical job order requires from 600 to 1000 characters, the present terminal can easily hold a full days work for subsequent re-examination or reporting.

Therefore, it is an object of the present invention to provide a telephone craft technician terminal that is compact, rugged and capable of multiple communication functions for interconnection with a central access network.

It is a further object of the present invention to provide such a terminal having multiple communication capabilities that is a pocket-sized, hand-held unit while still being relatively inexpensive to construct.

It is yet another object of the present invention to provide a technician's terminal that has the capabilities for receiving and transmitting data via interconnection to the central station while also having readout, repeat and message construction capabilities.

Finally, it is an object of the invention to provide a telephone craft technician's terminal that may be used with any of several access levels of present telephone networks to provide complete data exchange via line interconnection.

Other objects and advantages of the present invention will become evident from the following detailed description when read in conjunction with the accompanying drawings.

BRIEF DESCRIPTION OF THE DRAWINGS

FIG. 1 is a functional block diagram of the present invention;

FIG. 3 is a schematic drawing illustrating the power control, matrix switching and central processing unit of the present invention;

FIG. 5 is a schematic diagram illustrating the address decoding circuitry and the modem circuitry of the present invention.

DETAILED DESCRIPTION OF THE INVENTION

Figure 2A:
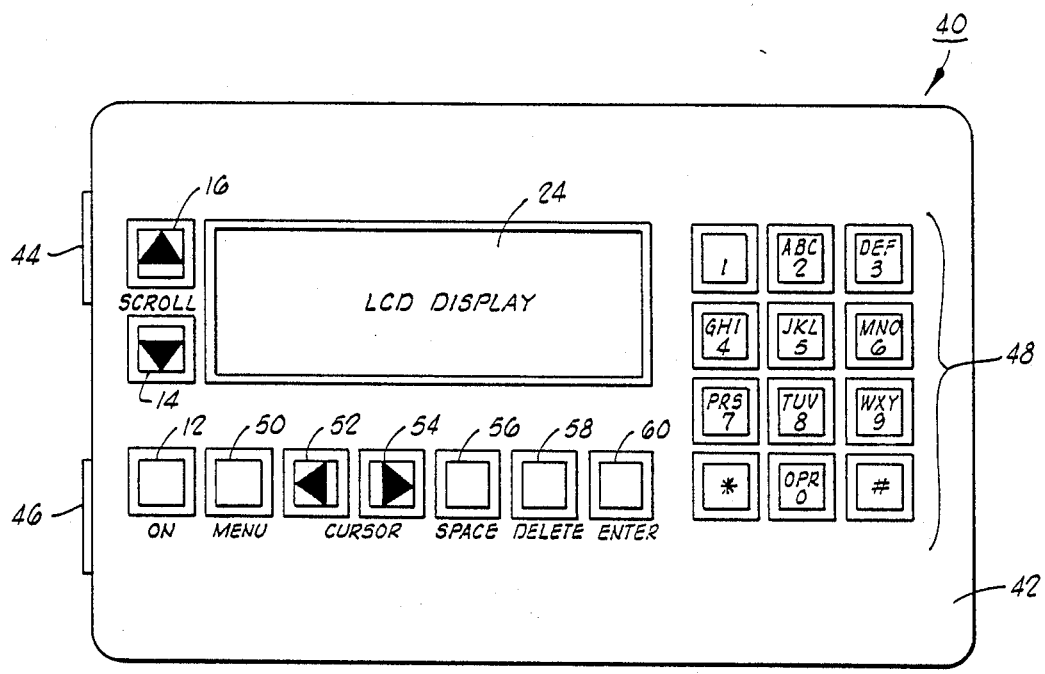
FIG. 2A is a front view of the craft terminal unit.

In one present day form of telephone operating system having a central computer network, an access system has been included which is known as a telephone access network (TAN) which provides for communication with craft technicians in the field. The system is capable of receiving calls from a craft technician via a dialed connection over the public switched telephone network. The TAN network provides protocol conversion that makes it possible for the technician to perform a number of field functions without the aid of a maintenance administrator. Thus, the craft technician is able to (1) process requests for new work; (2) process requests for circuit tests via mechanized loop test systems and (3) to clear and close out completed work orders with the operating system central.

This particular TAN system provides for three levels of access, each level having a different telephone access number assigned to it. The access level will determine the type of peripheral hardware that is required in order to communicate with the various types of craft technician terminal equipment.

The TAN access Level 1 requires the least expensive and relatively simpler craft terminal equipment. It consists of an access peripheral that provides line supervision, detection of an incoming call, a register that will accept dial tone multi-frequency (DTMF) signaling, a text-to-speech converter, and a synthesized speech output device to provide prompting and reporting to the craft technician. Level 1 requires that the craft technician terminal consists of at least a butt set equipped with some kind of amplifier/loud speaker device that will enable the speech output to be heard without the necessity for placing the handset to the ear after the DTMF commands have been transmitted to the TAN system.

Level 2 is a hybrid arrangement, e.g., it utilizes DTMF command signaling to gain access, to interrogate, and to enter data, but it can also respond in ASCII. The TAN peripherals for this level contain a DTMF register, a speech output device for prompting, and a 300/1200 baud modem for downloading any work orders and/or measurements. The terminal of the present invention is primarily designed for operation with the Level 2 Tan peripherals although it is contemplated that it will be useful for employ with Level 3 requirements but this cannot be determined until all such requirements have been established and published.

Access Level 3 is basically data only. The TAN system is linked to a standard auto speed 300/1200 baud modem. All requests are transmitted in ASCII from any dumb terminal, and the same log-on commands and six digit craft identifiers that are utilized in Levels 1 and 2 will be used to gain access and communicate in access Level 3.

FIG. 1 illustrates a block diagram of the craft technician's terminal. The circuitry is miniaturized to greatest extent while still providing the requisite capabilities. A miniature computer 10 includes the necessary central processing unit, random access memory and erasable programmable read only memory, as will be further described below. Input control commands to the computer 10 are provided by the on/off control 12, down scroll of the display 14, upscroll of the display 16, edit cursor control 18 and data upload cursor control 20. The computer 10 is connected through a plurality of liquid crystal display drivers 22 to a suitable liquid crystal display 24. Preferably, the LCD display 24 will provide at least four lines of 20 alpha-numeric characters, as will be further described.

Addressed data exchange takes place between computer 10 and a universal, asynchronous receiver-transmitter circuit 26 which is interconnected with both a modem 28 and a dual tone multi-frequency encoder/decoder 30. The modem 28 and encoder/decoder 30 are both further connected in parallel to a connector 32 which functions to interconnect with a selected telephone system line, as will be further described below.

Figure 2B:
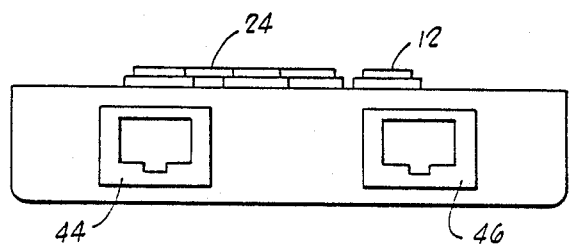
FIG. 2B is an end view of the craft terminal unit.

FIGS. 2A and 2B illustrate the terminal 40 as it appears in present design. The terminal 40 is enclosed in a rectangular case 42 which is pocket-sized and adapted for hand-held operation. A pair of RJ-11 connector plugs 44 and 46 are provided in an end panel to provide water proof interconnection. The LCD 24 is placed generally centrally in the front panel of case 42 and a standard 16 button key pad 48 is disposed adjacent thereto. A series of individual control pressure pads are then provided for selected terminal operations. Thus, we have the upscroll button 16 and downscroll button 14 aligned on one side with the on/off button 12. Across the bottom beneath display 24 is a MENU select button 50, the cursor left and right buttons 52, 54, SPACE button 56, DELETE button 58 and ENTER button 60.

Figure 4:
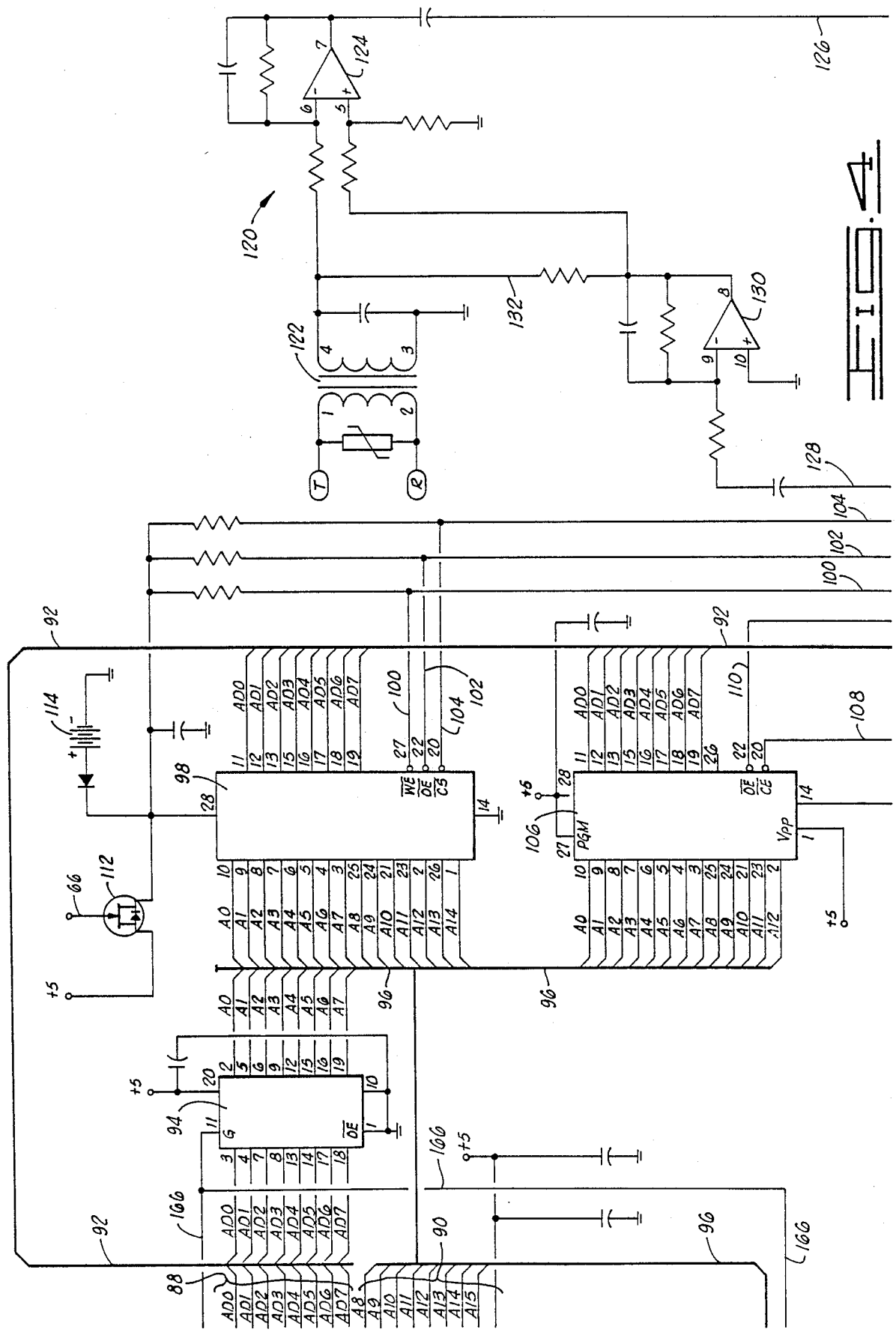
FIG. 4 is a schematic drawing illustrating the storage network and data access circuitry of the present invention.

FIGS. 3, 4 and 5 represent the schematic diagram for the circuitry of the present invention. Referring first to FIG. 3, there is included the power control, battery monitor, switch matrix circuitry and the microprocessor. Depression of button 12 actuates ON switch 62 to apply +9 volt supply to an IC type 4013 flip flop 64 which provides a power gate output at the Q output on lead 66. The power gate output on lead 66 is then applied around the circuitry as a turn-on signal to various FET transistors, as will be further described.

The main power battery 68, a 9 volt D-C source, is applied through an IC type MA78L05 voltage regulator 70 and output is controlled by a type 2N7000 field effect transistor (FET) 72 which has been turned on by application of power gate on lead 66. This allows output of the system energizing voltage of +5 volts D-C at lead 74.

A battery monitor circuit consisting of an IC type LM348 quad op-amp 76 continually monitors the regulated +5 volt D-C via reference voltage input 78, and diode 80 detects any undervoltage condition which is applied to port 21 of the microprocessor 82, a Hitachi IC type HD63A03 integrated circuit chip.

A crystal 84 oscillating at 4.9152 megahertz basic clock frequency is input to pins 2 and 3 of microprocessor 82. An interrupt signal as received from the modem (line 168), as will be described, is applied to pin 5 and a reset input is applied to pin 6. Port 20 (pin 8) of microprocessor 82 receives the $\overline{Q}$ output from the flip-flop 64.

A switch matrix 84 includes all of the keypad and function control switches as the matrix is connected for input between selected ones of microprocessor ports P22 and P10–P17. Finally, a receive data signal RXD is output from port 23 while a transmit data signal TXD outputs from port 24, and these are applied in control of the modem, as will be further described.

Referring again to microprocessor 82, pins 38, 39 and 40 provide control output of read/not write, address strobe and enable voltage for control of data demultiplexing and address decoding, as will be described. Ports P30–P37 provide 8 bit address plus data (time multiplexed) for output on 8 bit lead group 88, and ports 40–47 provide address output via 8 bit lead group 90.

Referring now to FIG. 4, the microprocessor address-data outputs AD0–AD7 are placed onto AD buss 92 which delivers data to various of the storage circuits of FIG. 4 as well as the modem circuit of FIG. 5, as will be described. AD0-7 is present at the input ports of AD multiplexer 94, an IC type 373 octal transparent latch, the output of which is placed on address leads A0–A7 on the A buss 96. A random access memory 98, a 32k×8 bit CMOS IC type HM62256LP-15, is connected to the AD buss 92 and 8 bit leads AD0–AD7 via pins 11 through 19 while the remaining opposite ports are connected to the address bit leads A0–A14 and A buss 96. Lead 100 provides write enable input, lead 102 provides output enable and lead 104 provides chip select input.

EPROM 106, an 8k×8 bit CMOS IC type 27C64, is connected in parallel with the random access memory 98. Thus, the ports 11-19 connect AD0-7 output leads to the AD buss 92 and the opposite side ports receive connection of the A0–A12 leads from the A buss 96. Chip enable input is provided on a lead 108 while output enable is received on lead 110. Ram control functions in response to application of the power gate voltage on lead 66 to a field effect transistor switch 112 as at controls development of signals on leads 100, 102 and 104. A 3.5 volt Lithium battery 114 is also connected to pin 28 of the random access memory 98 to function as keep-alive voltage in the event that the main battery 68 should lose power.

System access is provided by the circuitry indicated generally as 120 as tip (T) and ring (R) connection is made across a transformer 122 to provide signal input to an op-amp 124, a portion of a quad op-amp integrated circuit. The op-amp 124 functions to amplify incoming data signals from transformer 122 as received at pin 6, and amplified output via lead 126 of any incoming received analog signal is applied to the modem circuitry, as will be described.

Transmitted time analog signal originating through the modem is present on a lead 128 for input to pin 9 of an op-amp 130, also type LM348, and amplified analog signal is present on output lead 132 so that the time analog signal is applied through transformer 122 and back through the tip and ring connections onto the telephone system lines for transmission to the central network.

We proceed now to FIG. 5 which includes the address decoding circuitry, the display circuitry and the modem. A data selector 136, an IC type HC257 quad two-line to one-line data selector, receives enable input via line 138 from the enable voltage pin output 40 of the microprocessor 82. The address strobe from pin 38 of microprocessor 82 is conducted via lead 140 for input to connections B2 and, after inversion, to connector B1 of the data selector 136. Read and write outputs from ports Y1 and Y2 on respective leads 110 and 142 are then directed towards control for output enable and write enable of RAM 98. Continuity of control lead 142 and lead 100 is completed upon application of power gate voltage on lead 66 to an FET transistor 144. Power gate voltage on FET transistor 146 enables continuity from lead 110 to the lead 102 and pin 22, the output enable of RAM 98. Read and write outputs on leads 110 and 142 are applied directly to the respective read and write ports of EPROM 162.

The A buss 96 distributes in the data selector circuitry as the A15 lead is connected to the A input of a decoder 150, an IC type HC139 dual two-line to four-line decoder. Output pin 4 provides a RAM chip select output on a lead 152 which finds continuity through power gate enabled FET transistor 154 to lead 104 and chip select pin 120 of RAM 98 (FIG. 4). Pin 5 output from decoder 150 is applied to the enable input pin 15 of a counterpart decoder 156 which also receives A13 and A14 inputs at ports A and B. Pin 12 output from decoder 156 then provides an enable signal for the liquid crystal display for input at port B3 of data selector 136. Pin 11 output is applied via lead 160 as a chip select signal to pin 20 of a modem 162. The modem 162 is a standard Silicon Systems, Inc. single chip modem type (Bell) 212 A/103. This is a standard modem that is configured to define the standard United States modem connection, and it should be understood that other modems might be selected in order to conform to a particular transmission standard, e.g., the European standard.

A crystal oscillator 164 operating at 11.0592 megahertz provides the basic clock frequency control for the modem 162 as pins 13 and 14 receive write and read signals from lines 110 and 142 from the data selector 136. The AD buss 92 delivers AD0-AD7 inputs to respective pins 4-11 and address strobe control at pin 12 (ADD latch enable) is supplied by a lead 166 from the pin 39 output of the microprocessor 82. A time analog transmission signal (TXA) is conducted from pin 16 via lead 128 for input to the output power amplifier, amp 130 (FIG. 4). Received analog signal (RXA) on lead 126 is applied at Modem pin 27. Interrupt control at pin 17 is present on a lead 168 as connected to pin 5 of microprocessor 82, the interrupt request port. Pin 21 of Modem 162 receives transmit data signal (TXD) on lead 170 from pin 12 of microprocessor 82, and pin 22 receives receive data signal (RXD) on a lead 172 from pin 11 of microprocessor 82.

The AD0-AD7 address data leads from AD buss 92 are also applied to the respective plug contact 7-14 of the 14 pin socket 174 which is adapted to receive a standard form of LCD driver/display integrated circuit. In a preferred form, there is utilized a VL Electronics, Inc. 20 character × 4 line dot matrix LCD module, type No. MDL-20464-LV. The LV designation relates to ambient operating temperature and this may vary with different applications. Inverted output from Y3 port of data selector 136 is applied as read/not write signal via lead 176 to pin 6 while socket pin 5 receives inverted not read/write signal on lead 178. Socket pin 4 receives AO signal from A buss 96 and socket pin 3 receives a 5 volt signal on lead 180 from a −5 volt D-C/D-C converter (not shown) which is connected at junction point 182.

The terminal circuitry as set forth in FIGS. 3, 4 and 5 is adequate to carry out the requisite testing control functions to a varying degree of completion and resolution as regards the particular telephone test functions, data exchange, display, etc. A skilled computer programmer can readily write the requisite program for controlling the terminal circuitry of FIGS. 3, 4 and 5, and it is submitted that the particular software programs will vary within wide limits depending upon the individual programmers. One current form of software program that has proven operational is submitted with the present application as exhibitory material.

In operation, the craft technician's terminal 40 as employed with a selected level of the TAN system enables the telephone technician to carry out all repair job functions, with remote aid as required from the TAN system, while still having the capability for visual readout of downloaded information from TAN as well as the ability to upload data to TAN by either DTMF or ASCII transmission. In addition, the present terminal has sufficient storage capacity to store a number of different job related data passages, i.e., easily enough storage capacity to contain a normal full days work.

The terminal 40 is connected in parallel with a butt set that is first connected onto the telephone line for the purpose of establishing initial contact with the central access network e.g., TAN. Standard RJ-11 connectors are used. The technician can then dial the code log-on and password numbers to request job data from TAN whereupon the terminal 40 receives download of data in ASCII code which is decoded and entered in RAM 98 while also being displayed on LCD 24. The modem 162 provides 300/1200 baud data handling in communication with serial asynchronous ASCII code transmission from the central TAN.

The RAM 98 has capacity to store up to 20 messages of 1,000 characters. All data received at terminal 40 will be stored in RAM 98 in the order in which it comes in, and when the allocated RM storage is full, the oldest data will be flushed out. The EPROM 106 functions only to store the program instruction data for controlling operation of the microprocessor 82.

The LCD display 24 has a display area of at least four lines of twenty alpha-numeric characters (four rows, twenty columns). Switch buttons 52, 54 (FIG. 2A) control line cursor indication which permits the user to edit one line of the four-line display at a time. If an error is made, the user can move the cursor along the left margin of the screen to the line requiring correction. Correction may then be made by typeover. Switch buttons 14 and 16 provide the capability for scrolling the display either up or down to review previous messages. Whenever terminal 40 is connected to a telephone line and receiving data, the incoming messages will be displayed serially on LCD 24.

The terminal 40 can operate to download the contents of memory to a printer; but, primarily, it functions to upload memory content to the central TAN or equivalent by either DTMF or ASCII coded transmission. The terminal 40 has internal power supply and can perform off-line entry wherein the technician uses alpha-numeric keypad 48 to construct a message as displayed on LCD 24. The technician can then connect the terminal 40 and butt set to the telephone service line and, by depressing the ENTER button 60, the message is transmitted line by line via DTMF coded transmission to the central TAN.

There are a number of different codes for translating data via the standard keypad. In present programming, the terminal 40 uses DTMF coding where numeric characters are sent direct single digit with alpha characters coded by a double digit indication. A double asterisk indication is used for shifting back and forth between alpha and numeric characters. The double digit alpha code, for example to send an "A", would depress the "2-ABC" key first to represent the grouping ABC, and the second digit "1" is depressed to indicate the "A". Thus, "B" would enter "2-2", "C" would enter "2-3", "D" - "3-1", etc.

Before undertaking operation of the present terminal, the operator must configure the terminal to operate with whatever the selected TAN system and/or access level, and this can be accomplished by answering questions that are prompted by the terminal. The operator will have a "USER'S GUIDE" which offers step-by-step instructions for readying the terminal for operation.

Discussed in order, set up procedure is as follows. Step 1, the operator is instructed to turn the terminal on by pressing the ON key 12 and, as presently programmed, this will produce an LCD multi-line readout stating "CMC VERSION 1.0 BATT OK-RAM OK PRESS ENTER OR MENU." The operator is then told to press the UP arrow scroll key twice and he receives the following multi-line result: "TERMINAL CONFIG. PRINT CLEAR MEMORY (SCROLL DOWN)"; and, thereafter the operator presses the ENTER key upon instruction and the LCD reads "UPLOAD TO HOT MODE =ASCII Y/N." To this point the terminal is acceptable for use at TAN Level 1.

If you are to use the TAN Level 2 access mode, the operator is then instructed to press the DELETE key and then the ENTER key and this will program your terminal to receive messages in ASCII and to transmit in DTMF (touch-tone) to the TAN system. The result readable on the LCD is "SPEED EQUAL 1200 Y/N". Thereafter, if 1200 baud is the correct speed, the operator can then press ENTER and the LCD will read "EOL=CR Y/N"; or, if 1200 baud is not correct, the operator can press the DELETE key once whereupon the "SPEED=300 Y/N" will appear which, if correct, press ENTER and the LCD will read out the correct "EOL=CR Y/N".

Next, if the EOL (end of line) sequence is correct, the operator can press ENTER and the result reading out on the LCD is "CMC VERSION 1.0 BATT OK-RAM OK PRESS ENTER OR MENU". In the event that "CR" is not the correct EOL sequence, the operator can press the DELETE key and this will cause the terminal to display the following options: "EOL=CR/LF Y/N", "EOL=LF Y/N" or "EOL=-NONE". When the correct EOL sequence has been displayed, press ENTER and the result will appear on the LCD display reading "CMC VERSION 1.0 BATT OK-RAM OK PRESS ENTER OR MENU". When this screen message appears, all settings will be saved for the use of the operator when communicating with the TAN system.

In order to effect downloading of data from the TAN system to the craft technician's terminal, the procedure is as follows. The operator connects the butt set to the telephone service line, i.e., the time honored telephone receiver/transmitter interrupt set, standard equipment for linemen. Next, the craft technician terminal 40 is connected by means of an RJ-11 plug/cord set from the butt-in connection and the operator dials the coded access number for TAN Level 2. When TAN answers, the operator then enters the log-on digits and the user ID digits by means of the DTMF keypad 48. The operator then requests download from the TAN system by entering the appropriate DTMF command sequence. The modem 162 then detects carrier and return carrier signal with the resulting LCD display "connected".

The downloaded message will then appear on the LCD 24 while also being retained in terminal memory. Thus, for example, a readout multi-line message may appear as "555-1212/no dial tone/1234 Country Lane/Trent, Robert", and this message in effect gives the operator his job order by telephone number, failure complaint and address of telephone customer. It may be noted here that the LCD display 24 will automatically turn off after 180 seconds of no activity; however, to recall the message previously placed on the LCD display 24, the operator need only press ON to bring back the same message. It may be noted that the last message received will always appear on the display. To view other messages, the operator may press the scroll UP arrow button until the desired message is in the viewing screen. Each time the scroll UP arrow button is pressed, the display will advance one line.

When operating in TAN access Level 2, the operator also has the capability of uploading data from the handheld terminal back to the TAN system central. Any messages that the operator wishes to upload in the TAN system can be prepared on the handheld terminal prior to calling the TAN access number. This procedure is referred to as "off-line editing". In order to prepare a message for transmission to the TAN system, the operator can press the ON key and then follow with pressing the MENU key with a resulting LCD readout "OFF LINE EDIT DIRECTORY TERMINAL CONFIG. (SCROL UP)". If the operator now presses ENTER the terminal scrolls to a blank page above the operators last message and he can then enter the message from the DTMF keypad at the right of the display screen. The operator may enter the first line of the message and then press ENTER which functions to save the line just entered and scroll the text down one line whereupon the cursor will be at the left top margin and ready to accept the second line of text.

With the terminal connected to the butt set and the local telephone line, the operator next dials the TAN Level 2 access number and, after log-on and ID procedures are complete, the DTMF command sequence can be entered to prepare the TAN system for reception of the message. Then, when voice prompt is received, the operator presses ENTER to effect transmission. The top line of the display will be transmitted in DTMF using the TAN format and the line of text transmitted will scroll up automatically bringing the second line of text to the top line of the display and ready for transmission. Pressing of ENTER will commence sending of the second line of text, etc. That is, procedure is repeated for each line until the entire message is transmitted to TAN. The terminal can be disconnected from the telephone service line when the transaction is completed and the technician's terminal will shut off automatically.

The foregoing discloses a novel terminal for use for the craft technician in the field to communicate fully with the central access network. The specification is particularly described with respect to the operating systems which utilize the technician's access network (TAN) but it should be understood that equivalent types of operation may readily be performed with any number of central network reporting arrangements.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. A portable craftman's terminal for communicating with a central access network of a telephone operating system, comprising:
    means for connecting the terminal in communication with the central access network;
    means actuatable to transmit a code signal to the central access network to initiate downloading of ASCII coded data from the central access network;
    a central processing unit including a random access memory and erasable programmable read only memory;
    means for receiving downloaded ASCII coded data as transmitted from said central access network;
    a modem receiving said ASCII coded data and reformatting for input conversion to a serial tone signal;
    a parallel-to-serial converter receiving said serial tone signal and providing output of a parallel multi-digital signal for input to said central processing unit;
    display means receiving output from said central processing unit for displaying said downloaded data;
    dual tone multi-frequency keypad means operative thru said central processing unit for composing an alpha-numeric data message as an encoded serial tone signal for processing through said converter, and for storage in said central processing unit random access memory, and for read out on said display means; and
    means for transmitting a dual tone multi-frequency coded data message of upload to said central access network.

2. A portable terminal as set forth in claim 1 which further includes:
    means for outputting data shown on said display means to an external print facility.

3. A portable terminal as set forth in claim 1 wherein said central processing unit further comprises:
    microprocessor means controlled by program to coordinate operative functions of said terminal;
    said erasable, programmable read only memory means is for storing said program for selective input to said microprocessor means.

4. A portable terminal as set forth in claim 1 wherein said display means comprises:
    a liquid crystal display having at least four rows and twenty columns.

5. A portable terminal as set forth in claim 3 wherein:
    said random access memory means has at least a $32K \times 8$ bit capacity.

6. A portable terminal as set forth in claim 5 wherein said display means comprises:
    liquid crystal display having at least the capacity for four lines of twenty characters.

7. A portable terminal as set forth in claim 1 wherein:
    said modem functions to interface coded serial tone signal from said converter representative of ASCII coded data at a preselected Baud rate; and
    means transmitting said ASCII coded data for upload to said central access network.

8. A portable terminal as set forth in claim 7 which further includes:
    means for varying the code transmission by selecting 300 or 1200 Baud rates.

9. A portable terminal as set forth in claim 7 which is further characterized in that:
    said random access memory has on the order of a 32K by 8 bit capacity.

10. A portable terminal as set forth in claim 9 which includes:
    means for storing all data processed and displayed in serial form with flushing of oldest data when full capacity of the random access memory takes place.

11. A portable terminal as set forth in claim 10 which includes:
    means for initiating upload of all stored data in said random access memory by transmission to said central access network.

* * * * *